United States Patent [19]

Iovine et al.

[11] 4,129,722

[45] Dec. 12, 1978

[54] PROCESS FOR THE PREPARATION OF HIGH D. S. POLYSACCHARIDES

[75] Inventors: Carmine P. Iovine; Dilip K. Ray-Chaudhuri, both of Bridgewater, N.J.

[73] Assignee: National Starch and Chemical Corporation, Bridgewater, N.J.

[21] Appl. No.: 860,952

[22] Filed: Dec. 15, 1977

[51] Int. Cl.$^2$ .................... C08B 11/00; C08B 31/08; C08B 37/00
[52] U.S. Cl. .......................................... 536/43; 536/1; 536/58; 536/84; 536/102; 536/106; 536/110; 536/114
[58] Field of Search .................. 536/43, 1, 114, 110, 536/106, 102, 58, 84; 106/170

[56] References Cited

U.S. PATENT DOCUMENTS

| 2,523,709 | 9/1950 | Moe | 536/111 |
| 2,975,124 | 3/1961 | Caldwell et al. | 536/50 |
| 3,062,810 | 11/1962 | Hjermstad et al. | 536/111 |
| 3,246,997 | 4/1966 | Sumner et al. | 106/170 |
| 3,347,814 | 10/1967 | Hatala | 106/170 |
| 3,372,050 | 3/1968 | Weber | 106/170 |
| 4,031,305 | 6/1977 | DeMartino | 536/114 |

OTHER PUBLICATIONS

Gray et al., Die Starke, Number 7, 1962, pp. 239–246.

Primary Examiner—Ronald W. Griffin
Attorney, Agent, or Firm—Edwin Szala; Ellen T. Dec

[57] ABSTRACT

Water soluble and water swellable highly substituted polysaccharide derivatives are prepared in highly concentrated aqueous solutions under controlled reaction conditions. The resultant derivatives are produced efficiently and readily isolated in solid form.

11 Claims, No Drawings

PROCESS FOR THE PREPARATION OF HIGH D. S. POLYSACCHARIDES

BACKGROUND OF THE INVENTION

I. Field of the Invention

This invention relates to a process for preparing water soluble and water swellable highly substituted polysaccharide derivatives. More specifically, it relates to a general process for preparing polysaccharide derivatives under controlled conditions such that the derivative is produced efficiently and at high substitution and is readily isolated in solid form.

II. Brief Description of the Prior Art

Method for preparing water soluble or water swellable derivatives of polysaccharides such as starches, cellulose and gums are well known in the literature. (See, for example, R. L. Whistler, *Methods in Carbohydrate Chemistry*, Vol. IV, 1964, pgs. 279-311; R. L. Whistler, et al., *Starch - Chemistry and Technology*, Vol. II, 1967, pgs. 293-430; and R. L. Davidson and N. Sittig, *Water-Soluble Resins*, 2nd Ed., 1968, Chapter 2). Such methods generally involve the use of high dilution aqueous techniques, dry reactions, reactions conducted in water-solvent mixtures or aqueous inorganic salt systems.

Most of the techniques of the prior art are limited in a practical sense because of the high solution viscosities associated with these types of highly substituted natural polymers. Since the water solubility of the polysaccharide increases, for example, as the number of derivatizing groups introduced is increased, there is a limit to the degree of substitution that can be reached by prior art techniques involving water, water-salt or water-solvent systems. Dry reactions are usually run at elevated temperatures and as such may be accompanied by some degradation of the polysaccharide backbone. Additional problems with the prior art techniques are encountered in recovering the derivatized polysaccharide as a solid product.

It is therefore an object of the present invention to provide a simple and efficient process for preparing water soluble and water swellable polysaccharide derivatives.

It is also an object of the invention to provide such a process wherein the derivatization may be carried out in aqueous environments at high concentrations while avoiding the problems of the prior art aqueous techniques.

Finally, it is an object to provide a process for the production of such derivatives which can be isolated directly from the reaction mixture in the form of solid beads.

SUMMARY OF THE INVENTION

The above-mentioned and related objects are achieved in accordance with the process of the present invention which comprises suspending the polysaccharide in an organic solvent and adding thereto a water solution of the derivatizing reagent. Derivatization of the resultant two-phase mixture is ordinarily carried out with agitation at temperatures of 30° to 85° C., adding alkali if necessary to effect reaction. It is required that at least one of the initial phases (i.e. the suspended polysaccharide or the aqueous reagent solution) contain a suitable surfactant. Moreover, it is important that the organic solvent used in the initial polysaccharide phase be immiscible with the aqueous derivatizing reagent phase, that it not dissolve the reagent or polysaccharide derivative as it is formed, that it have a boiling point at or above the temperature of the derivatizing reaction, that it be insensitive to alkali and not participate in the derivatization reaction.

In accordance with the process of the present invention the two phases, upon combination, form a discontinuous phase comprising a multitude of discrete spheres suspended in a continuous immiscible organic solvent phase, each sphere consisting of a self-contained aqueous reaction system containing both polysaccharide substrate and reagent as well as water and alkali, if present, in proportions such that the solids content is greater than 50% by weight of the total aqueous reaction system. The soft sphere-like particles formed by the mixture retain their integrity while hardening up throughout the reaction and on completion of the reaction, the mixture is either cooled and optionally neutralized, or dewatered by azeotropic distillation prior to or after neutralization. The product is then readily recovered in bead or granular form by filtration or centrifugation and drying.

As a result of the high solids concentration at which the derivatization reaction is carried out, the resultant derivatives are formed in solid form and at high efficiency, generally in excess of 75%, yielding highly substituted products, generally in the range of 0.05 to 2.5 D.S. and, as such, are desirable for use in a wide variety of end use applications.

An additional feature of the process of the present invention is the ability to produce substituted polysaccharides containing substituents derived from different reagents without isolating the substitution product from each reagent. This multiple substitution may be accomplished by the addition of several different reagents to the substrate-surfactant-alkali mixture at the same time or sequentially.

DETAILED DESCRIPTION OF THE PREFERRED EMBODIMENTS

The polysaccharide substrates suitable for use in the practice of this invention include starches and starch conversion products derived from any plant source; starch ethers and esters; cellulose and cellulose derivatives and various plant gums. The substrate may be used in water soluble or water insoluble form.

Starches including those derived from corn, potato, wheat, rice, sago, tapioca, waxy maize, sorghum and amylose, as well as the conversion products and derivatives thereof, are the preferred substrates due to their cost and availability.

The polysaccharide is initially suspended in a continuous organic solvent phase which may contain a solvent-soluble surfactant (to be discussed hereinbelow) in an amount of 1-12% by weight of the solvent. The solvent chosen must be one which is immiscible with water, which does not dissolve the reagent or the polysaccharide derivative as it is formed, which has a boiling point at or above the temperature at which the reaction will be carried out, which is insensitive to alkali and which will not participate in the derivatization reaction. Suitable solvents are selected from the aromatic and aliphatic hydrocarbons as well as certain chlorinated hydrocarbons and may include benzene, toluene, xylene, heptane, octane, nonane, isooctane, methylene chloride and dichlorobenzene as well as other solvents within the described parameters known to those skilled in the art. Mixtures of such solvents may also be used.

The derivatizing reagents used in the process of the present invention may be any of the well known mono- or difunctional etherifying or esterifying reagents commonly used to produce nonionic, cationic or anionic sites on the polysaccharide substrate, and thus render it water swellable or water soluble. The reagents useful herein are soluble in water at least to the extent of 1% by weight. Among such suitable reagents are included: epoxide etherifying agents such as the epoxy alkanes, e.g. ethylene oxide, propylene oxide, and butylene oxide; halohydrins and other halogen substituted reagents, e.g. epichlorohydrin, ethylene chlorohydrin, sodium monochloroacetate, sodium monochloropropionate, dimethylaminoethyl chloride, diethylaminoethyl chloride, 1-chloro-2-hydroxypropyl trimethyl ammonium chloride, methyl chloride; activated unsaturated compounds capable of reacting with the hydroxy groups of the polysaccharide, e.g., acrylic acid, crotonic acid, acrylonitrile, acrylamide, or acrylate esters; and organic anhydrides, e.g., acetic anhydride, maleic anhydride; alpha-halo esters, acids and amides, e.g., chloroacetic acid and chloroacetamide, etc.; as well as such reagents which will result in the production of inorganic polysaccharide phosphate and sulfate derivatives, e.g. alkyl and dialkyl sulfates such as dimethyl sulfate and diethylaminoethyl sulfate, 2-haloalkyl sulfonic acids, propane sultone, divinyl sulfone, sulfolene, sodium tripolyphosphate, sodium dihydrogen phosphate, etc. These derivatizing reagents may be used alone or in combination with each other.

It will be recognized that the amount of esterification or etherification achieved by the method of the present invention will vary based on a number of factors but mainly depending upon the nature of the specific polysaccharide, and the reagent employed. Thus, using starch as the representative polysaccharide and acetic anhydride as the reagent, it is relatively easy to achieve a D.S. of up to about 0.16 in water using conventional techniques and hence the method of the present invention would not be employed unless higher D.S. values were desired. In contrast, reagents such as diethylaminoethyl chloride can be reacted with starch in water only up to D.S. levels of about 0.05 before the starch product becomes too swollen to be purified by washing with water and the method presented herein would thus be useful whenever levels above this range were desired.

It will also be recognized that the reaction conditions' degree of alkalinity, etc. will vary depending upon the specific reagents employed. Illustrative patents covering a number of these reactions include U.S. Pat. Nos. 2,461,139; 3,022,289; 3,720,662; 2,975,124; 2,516,632; 2,516,633; 2,516,634; 3,033,852; 2,876,217; 3,378,547; 3,624,070; 2,523,709; 2,773,067; 3,062,810; 3,838,149 among others, the disclosures of which are incorporated herein by reference. Other patents directed to methods of esterifying or etherifying polysaccharides, usually in aqueous alkaline environments, are well known to those skilled in the art and are equally suitable for use in the present invention.

In general, the etherification or esterification reactions will be carried out at temperatures of 10 to 100° C., preferably 30° to 60° C. for a period of 1 to 24 hours. As the temperature is raised above about 65° C., it will be recognized that some degradation of certain polysaccharides will occur, however, such elevated temperatures are required for certain reactions to occur, e.g. the phosphorylation of starch. The amount of reagent used will vary over a wide range depending upon the molecular weight of the repeating unit of the polysaccharide as well as the desired degree of substitution, as will be recognized by those skilled in the art. The reagent may be added in bulk but generally will be used in aqueous solution, which solution may also contain a water-soluble surfactant in amounts of 0.5-12% by weight of the polysaccharide substrate.

As indicated hereinabove, the surfactant or surfactants used in the preparation of the polysaccharide derivatives is an integral part of the present invention. It is known in the polysaccharide art that surfactants tend to react with polysaccharides (some more than others) such that the water-dispersibility of the polysaccharide is reduced by the presence of the surfactant. (See, for example, Gray, Virginia M., et al. *Die Starke* 14, p. 239-246, (1962) ). The polysaccharide and surfactant form a complex reducing the water-dispersibility of the polysaccharide relative to its dispersibility in the absence of the surfactant. While applicants do not wish to be bound to any one theory as to the basis for the operability of the present invention, it is believed that the ability of providing the present polysaccharide derivatives is related to the reduction of the water dispersibility of the polysaccharides by the presence of the surfactant and in that manner avoids the viscosity problems of prior art processes using aqueous mediums. In the absence of the surfactant, the beads will coagulate during derivatization thereby destroying the suspension characteristics of the reaction mixture and rendering the resultant derivative intractable.

In general, any type of surfactant, i.e. nonionic, anionic or cationic, may be employed in the present invention with the anionic and nonionic surfactants being preferred. Particularly suitable surfactants are the oil-soluble polyhydroxyethylated compounds known as nonionic surfactants for example, hydroxyethylated long-chain monocarboxylic acids and fatty acids, fatty acid esters of sorbitol and hydroxyethylated fatty acid esters of sorbitol. The usually applied cationically active and anionically active emulsifiers, such as the alkyl aryl sulfonates, linear alkyl sulfonates and sulfates, for example, lauryl sulfate or sulfosuccinic acid ester, may also be used, if desired, instead of or in admixture with substances of the nonionic type. Such suitable surfactants are available under the tradenames Calsoft 30 (Pilot Chemical Co.), Span 60 and 80 (Hercules, Inc.), Brij 92 (Hercules Inc.), Igepal 990 (GAF), Triton X405 (Rohm and Haas Co.), etc. The suitability of a specific surfactant for its use in the present invention may be easily ascertained by preparing an aliquot of the intended mixture to determine if a stable suspension is formed. Specifically, however, the choice of the particular surfactant (or surfactants) to be employed will depend on a number of factors including the nature of the continuous phase, the ratio of polysaccharide to derivatizing reagent, the reagent or reagents used to produce the derivative, the degree of substitution desired; the type of polysaccharide substrate utilized; and the reaction conditions under which the derivatization occurs. If a water-soluble surfactant is employed, it is incorporated into the aqueous phase and used in amounts of 0.5 to 12% based on the weight of the polysaccharide substrate. When a solvent-soluble surfactant is employed, it is incorporated into the homogeneous phase at levels of 1-12% based on the weight of the solvent. When both types of surfactants are employed, they are added to the respective phases generally within the same levels disclosed hereinabove.

Thus, in accordance with a typical procedure of the present invention, a polysaccharide substrate is initially suspended in the continuous (organic solvent) phase which may contain a solvent soluble surfactant at 1-12% based on the weight of the solvent. To this is added, generally over a period of ½ to 3 hours at room temperature, the water soluble reagent or reagents in the form of aqueous solution(s) or in bulk. The latter aqueous solutions may also contain a water-soluble surfactant in an amount of 0.5-12% by weight of the polysaccharide substrate. Thereafter, if it is necessary to add alkali to drive the substitution reaction it may be added over a ½ to 3 hour period as an aqueous solution or in bulk. The combination of the two initial phases results in the production of an aqueous phase containing the polysaccharide, reagents and surfactant (if a water soluble surfactant is employed), suspended in a continuous organic solvent phase (which will also contain any solvent soluble surfactant which may have been used). The aqueous phase will have a solids concentration (polysaccharide derivatizing reagent, surfactant, if present, and alkali) in the range of 50-90% and preferably 60-80% solids, by weight. The concentration of these solids with respect to the continuous phase is designed at 15-50% solids, by weight, by adjusting the amount of organic solvent. The reaction mixture, comprising the aqueous phase in the form of soft sphere-like particles suspended in the continuous phase, is heated at 30°-100° C. for 1 to 6 hours to complete the reaction. As the reaction proceeds, the spheres harden while the suspension remains fluid throughout. At the end of the heating stage, the reaction mixture is either cooled and optionally neutralized or dewatered by azeotropic distillation prior to or after neutralization. The product is recovered as uniform solid beads by filtration or centrifugation and drying. Drying is accomplished using conventional methods, as in a vacuum dryer, a whirling layer drying apparatus or a roller dryer. After filtration, the filtrate can readily be recycled for the next batch.

In the following examples, which are merely illustrative of the various embodiments of the present invention, all parts are by weight and all temperatures in degrees Celsius unless otherwise indicated. It is to be noted that a large number of variations may be effected in reacting the starch base with the reagents in accordance with the invention without departing from the spirit and scope thereof. Such variations will be evident to those skilled in the art.

EXAMPLE 1

This example illustrates the preparation of an N,N-diethylaminoethyl chloride hydrochloride derivative of guar gum according to the process of the present invention.

A 500 ml flask equipped with a thermometer, mechanical agitator, condenser with acid trap and suitable sized dropping funnels was charged with 200 g. Isopar E (petroleum solvent composed principally of $C_8$ isoparaffins, B.P. 240°-287° F.) and 20.0 g. Brij 92 (ethoxylated nonyl phenol). To this mixture, 54.9 g. of medium viscosity guar gum containing 5% water was added with agitation. Thereafter, over a 30 minute period, 26.7 g. of an aqueous solution of N,N-diethylaminoethyl chloride hydrochloride (activity of 65.6%) was added with agitation. To the resulting reaction mixture, which consisted of small uniform spheres, 11.70 ml of 18.2N NaOH was slowly added from a burette over a period of 45 minutes. The reaction mixture exothermed at 25° to 35° C.

At the end of the addition, the reaction mixture was heated at 65°-70° C. for 4 hours, cooled and the pH adjusted to 4.5 using approximately 10.9 g. of concentrated HCl dripped into the reaction mixture over a 30 minute period. The final polymer product was recovered by filtration on a Buchner suction funnel and dried.

The polymer was completely cold water soluble forming a viscous solution at 1% concentration. After dialysis, the polymer had a nitrogen content of 1.98% (90% of theory) and an intrinsic viscosity of 2.7 dl/gm in 1N KCl. The yield of product was 72 g.

EXAMPLE 2

This example illustrates the preparation of a quaternary ammonium methosulfate derivative of guar gum using a multiple reaction technique according to the present invention.

The polymer of Example 1 was prepared as above except that after the heating stage, the reaction mixture was cooled to 25° C. and treated dropwise with 14.1 g. dimethyl sulfate to produce the quaternary ammonium methosulfate product. The quaternization reaction was exothermic and the temperature was allowed to rise to 35° C. The reaction mixture was maintained at 35°-40° C. for 2 hours at which time, it was cooled and filtered on a suction funnel. The yield of polymer beads was 83 g. A 1% solution of the polymer in water was very viscous, had a pH of 5.1 and a nitrogen content of 1.50% after dialysis (91% of theory) and an I.V. of 2.3 dl/gm in 1N KCl.

EXAMPLE 3

This example illustrates the production of a multiple substituted corn starch derivative prepared by the simultaneous addition of the derivatizing reagents.

A two liter 4-neck flask equipped with thermometer, mechanical stirrer, condenser with Dean-Stark trap and suitable sized addition funnels, was charged with 585 g. Isopar E and 58.5 g. Span 80 (Sorbitan monooleate), and 227.3 g. of corn starch at 12% moisture. With agitation, a mixture containing 106.7 g. diethylaminoethyl chloride HCl activity of 65.6%, 26.8 g. monochloroacetic acid and 14.3 g. Triton X405 at 70% was slow-added to the reactor over a ½ hour period. A fluid suspension consisting of uniformly shaped beads was formed. The suspension was treated with 75.90 ml of 18.6N NaOH over a 1 hour period during which the temperature rose to 38° C. After the addition was complete, the reaction mixture was heated for 3 hours at 65°-70° C. At the end of the heating stage, the pressure in the reactor was lowered to 120 mm Hg and the mixture heated at 70°-75° C. to distill the water/Isopar azeotrope. One hundred-twenty ml water was collected in 1½ hours. The mixture was cooled to 25° C. and treated with 15.00 ml of 11.95N $H_2SO_4$.

The product (322 g.) was recovered as uniform spheres by vacuum filtration and drying. A 5% solution of the polymer in water had a pH of 7.8. After dialysis the polymer had a nitrogen content of 1.88%, a carboxyl content of 5.9%, an I.V. of 1.00 dl/gm in 1N KCl and contained 3% volatiles.

TABLE I

| Ingredient | 5 | 6 | 7 | 8 | 9 | 10 | 11 | 12 | 13 | 14 | 15 |
|---|---|---|---|---|---|---|---|---|---|---|---|
| Amylose at 90% | 55.6 | | | | | | | | | | |
| Locust Bean Gum at 95% | | 54.9 | | | | | | 57 | 211 | | 228 |
| Waxy Maize Starch at 87.8% | | | | | 111 | | | | | | |
| Potato Starch 90% | | | | | | | | | | 55 | |
| Xanthan Gum 95% | | | | 113.6 | | | 227 | | | | |
| Corn Starch 88% | | | | | | 56.1 | | | | | |
| Acid Converted Corn Starch 89.2% | | | 52.6 | | | | | | | | |
| χ Cellulose 95% | | | 188 | | 180 | 160 | | | 600 | 200 | 585 |
| Isopar E | | 200 | | | | | | | | | |
| Isopar G | | | | | | | 500 | | | | |
| Hexane | 190 | | | 180 | | | | 175 | | | |
| Toluene | | | | | | | | | | | |
| 1-Chloro-2-hydroxypropyl trimethyl ammonium chloride 50% | 38.2 | | | | | | 60 | | | | |
| N,N-diethylaminoethyl chloride hydro-chloride 65% | | 26.7 | | | | | | | | 26.7 | |
| Chloroacetic acid | | | | 14.6 | | | | 7.5 | | | |
| Propane Sultone | | | | | | 10 | | | | | |
| Acrylamide | | | | | 54 | | | | | | |
| Propylene oxide | | | | | | 54.3 | | 54 | | | |
| Ethylene oxide | | | | | | | | | | | 57.3 |
| Aminoethyl sulfate | | | | | | | | | | | |
| 18N NaOH (ml) | 12.3 | 11.7 | 18.5 | 6.9 | 6.9 | 0.7 | | 4.5 | 68.6 | 11.7 | 22.6 |
| 12N HCl (ml) | | 9.1 | | | | | | | | 8.5 | |
| 11.9N H₂SO₄ (ml) | | | | | | | | | | | 15.4 |
| NaOH (solid prills) | | | | | | | 7.4 | | | | |
| Acetic acid | | | | 7.5 | 7.5 | | 1.5 | | | | |
| Sodium dodecyl benzene sulfonate | 5.9 | | 2.9 | 10.6 | | | | 5.7 | | | 4.7 |
| Polyoxyethylene oleyl ether (Brij 92) | | 20 | | | | | | | | 10 | |
| Sorbitan monosleate (Span 80) | | | | | | | | | | | 18 |
| Polyoxyethylene sorbitan monostearate (Tween 60) | | | | | | | 40 | | | | |
| Ethoxylated nonyl phenol (Triton X405) 40 moles E.O. | | | | | | | | | | 3.6 | |
| Sodium dioctyl sulfo succinate 70% | | | | | | | 3.5 | | | | |
| Sodium lauryl sulfate 85% | | | | | | 11.7 | | 2.4 | | | |
| Cocoyl amido betaine 50% | | | | | | | 40 | | | | |
| H₂O | | | 36.6 | 30 | 20 | 15.4 | 17 | 12 | | | 25 |
| Acrylonitrile | | | | | | | | | 65.4 | | |
| Temp. °C. | 65–70 | 63 | 75 | 55–60 | 60 | 45–50 | 65–70 | 75 | 75–80 | 65–70 | 80 |
| Hrs. of reaction | 4 | 5 | 3½ | 5 | 5 | 4 | 5 | 6 | 8 | 4 | 3 |
| Water removed (ml) | — | — | — | — | — | — | 45 | — | — | — | — |
| I.V. (1N KCl) | 0.65 | 3.70 | — | 1.2 | 1.7 | — | 1.16 | 2.30 | — | 4.53 | 2.0 |
| %N | 1.46 | 1.65 | * | * | * | 1.70 | 0.78 | | | 1.82 | 1.68 |
| %COOH | | | | | | | | | | 18 | |
| %S | | | | | | | | | 2.92 | | |
| %Reaction | 40 | 82 | — | 80 | 93 | 52 | 97.5 | 86.9 | 88.2 | 90 | 80 |

*not determined

EXAMPLE 4

This example illustrates preparation of a cold water soluble corn starch derivative using the multiple reaction technique of the present invention.

A 2-flask fitted with a mechanical agitator, thermometer, condenser and acid trap, was charged with 1000 ml toluene and 224.7 g. corn starch (11% moisture). To this was added over a ½ hour period a solution containing 40 g. sodium chloroacetate and 64 g. water. Next, 100 g. of a 20% aqueous solution of sodium dodecyl benzene sulfonate was slow-added to the reaction mixture over a 15 minute period. The bead-like slurry at this point, was treated with 29.4 ml of 12.54N NaOH over a 12 minute period, and 4.0 ml of a 2.5 weight by volume % solution of epichlorohydrin in toluene over a 5 minute period. The reaction mixture was heated at 70°–80° C. for four hours, cooled and recovered as uniform off-white spheres by filtration and drying at 60° C.

The product (275 g.) at 5% volatiles was completely cold water soluble and gave a clear viscous solution at 2.5% concentration with a Brookfield viscosity of 13,500 cps. The % COOH (after dialysis) was 6% (88% of theory) and the D.S. was equal to 0.22.

EXAMPLES 5–15

Using the procedures described in the previous examples, polysaccharide derivatives were prepared using the ingredients and reaction conditions shown in Table I.

We claim:

1. A process for the production of a water-soluble or water swellable highly substituted polysaccharide derivative comprising the steps of
   (a) suspending a polysaccharide substrate in an organic solvent, which solvent is immiscible with the aqueous derivatizing reagent phase, does not dissolve the reagent or polysaccharide derivative as it is formed, has a boiling point at or above the temperature of the derivatization reaction, is insensitive to alkali and does not participate in the derivatization reaction;
   (b) adding thereto an aqueous solution of the derivatizing reagent;
   (c) derivatizing the resultant mixture in the presence of alkali if required, with agitation at a temperature of 10° to 100° C.; and
   (d) isolating the resultant derivative; wherein it is required that either the aqueous solution or the organic polysaccharide suspension, or both, contain a cationic, anionic or nonionic surfactant and that the solids concentration is greater than 50% by weight of the total aqueous system.

2. The process of claim 1 wherein the organic solvent phase contains a solvent-soluble surfactant in an amount of 1–12% by weight of the solvent.

3. The process of claim 1 wherein the aqueous solution contains a water-soluble surfactant in an amount of 0.5–12% by weight of the polysaccharide substrate.

4. The process of claim 1 wherein the surfactant is selected from the group consisting of hydroxyethylated nonyl phenols, hydroxyethylated long-chain monocarboxylic acids, hydrooxyethylated long-chain fatty acids, fatty acid esters of sorbitol, hydroxyethylated fatty acid esters of sorbitol, alkyl aryl sulfonates, linear alkyl sulfonates and linear alkyl sulfates.

5. The process of claim 1 wherein the polysaccharide is a starch or derivative thereof and the derivatizing step is carried out at a temperature of 30° to 60° C.

6. The process of claim 1 wherein the polysaccharide is cellulose or a cellulose derivative or plant gum.

7. The process of claim 1 wherein the solids concentration is 60–80% by weight of the total aqueous system.

8. The process of claim 7 wherein the polysaccharide is a corn starch and the derivatizing reagent is diethylaminoethyl chloride hydrochloride.

9. The process of claim 1 wherein the derivatizing reagent is selected from the group consisting of epoxy alkanes, halohydrins and other halogen substituted compounds, activated unsaturated compounds capable of reacting with the hydroxyl groups of the polysaccharide, organic anhydrides, and phosphate or sulfate substituting reagents.

10. The process of claim 1 wherein the derivatizing reagent is selected from the group consisting of ethylene oxide, propylene oxide, butylene oxide, epichlorohydrin, ethylene chlorohydrin, sodium monochloroacetate, sodium monochloropropionate, diethylaminoethyl chloride, dimethylaminoethyl chloride, 1-chloro-2-hydroxypropyl trimethyl ammonium chloride, methyl chloride, acrylic acid, crotonic acid, acrylonitrile, acrylamide, hydroxypropyl acrylate, acetic anhydride, maleic anhydride, chloroacetic acid, chloroacetamide, dimethyl sulfate, diethyl-aminoethyl sulfate, 2-chloroethyl sulfonic acid, 2-chloropropyl sulfonic acid, propane sultone, divinyl sulfone, sulfolene, sodium tripolyphosphate and sodium dihydrogen phosphate.

11. The process of claim 1 wherein the organic solvent is selected from the group consisting of benzene, dichlorobenzene, toluene, xylene, heptane, octane, nonane, isooctane, and methylene chloride.

* * * * *